United States Patent Office 3,592,868
Patented July 13, 1971

3,592,868
OLEFIN ISOMERIZATION
Louis F. Heckelsberg, Bartlesville, Okla., assignor to
Phillips Petroleum Company
No Drawing. Filed Nov. 3, 1969, Ser. No. 873,504
Int. Cl. C07c 5/22
U.S. Cl. 260—683.2                        5 Claims

ABSTRACT OF THE DISCLOSURE

Olefins are isomerized by shifting the double bond by contact with a catalyst comprising ruthenium oxide.

---

This invention relates to the conversion of olefins. In one aspect it relates to a process for shifting the double bond of a double bond isomerizable olefin by contact with a catalyst comprising ruthenium oxide.

Many catalyst systems are known to have activity for a shift in the double bond of olefins. It is advantageous to find processes for such olefin isomerization utilizing catalysts not previously known for this reaction. Further it is desirable to find processes for olefin isomerization which can be applied selectively in a known and predictable manner.

An object of the invention is to shift the double bond of double bond isomerizable olefins. Another object of the invention is to isomerize olefins selectively.

Other aspects, objects and the advantages of my invention are apparent in the written description and the claims.

According to the invention, the double bond of a double bond isomerizable olefin reactant is shifted by contact with a catalyst comprising ruthenium oxide. The reaction is selective in that the conversion of 1-olefins results in a higher than expected ratio of trans-2-olefins to cis-2-olefins and in that cis-olefins are relatively unreactive.

The invention is applicable to 1-monoolefin hydrocarbons and transmonoolefin hydrocarbons. The invention finds particular utility with respect to such olefins having 4 to 10 carbon atoms per molecule having the formula:

I 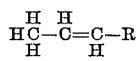

or

II 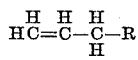

wherein I is trans configuration and wherein R can be an alkyl radical having 1 to 7 carbon atoms, or a phenyl, methylphenyl or cycloalkyl radical having 5 to 6 carbon atoms.

Included among the olefins which can be used are:

| | |
|---|---|
| 1-butene | trans-2-pentene |
| 1-pentene | 4-methyl-trans-2-hexene |
| 1-hexene | 4-phenyl-1-butene |
| 1-decene | 5-cyclopentyl-1-pentene |
| 5-methyl-1-hexene | 4-phenyl-trans-2-butene |
| 7-methyl-1-nonene | 5-isopropyl-trans-2-heptene |
| 5-ethyl-1-octene | trans-2-decene |
| trans-2-butene | |

Excellent results including high selectivity to the corresponding trans-2-isomer, in the case of 1-olefins, and to the corresponding 1-olefin, in the case of trans-2-olefins, are obtained according to the invention utilizing a reactant selected from the following list:

| | |
|---|---|
| 1-butene | trans-2-butene |
| 1-pentene | trans-2-pentene |

The conversion of 1-olefins to the trans-2-isomer or trans-2-olefins to the corresponding 1-isomer, with the cis-2-isomers being relatively unreactive is quite surprising. Ordinarily in mixtures of 2-isomers substantial quantities of both the cis and the trans forms are present, the trans form generally predominating slightly. Also, it is generally considered that the mechanism for a double bond isomerization transformation is such that it goes through the cis-2-isomer stage, thus resulting in substantial quantities of cis-2-isomer being present at all times. With the conversion of the present invention, however, this is not the case. For example, when substantially pure trans-2-butene is contacted according to the present invention, 1-butene is obtained with relatively little formation of cis-2-butene. Similarly when relatively pure cis-2-butene is contacted, very little if any isomerization products are formed. When a mixture of cis and trans-2-butene is reacted, the trans-2-butene is converted to 1-butene, while the cis-2-butene is essentially unconverted.

Thus, the conversion according to the present invention can be used to effect transformations between the trans-2-isomers and the 1-isomers when one or the other is the desired material for a specific purpose. Selective catalytic process can also be used with advantage in the separation of difficulty separable isomers such as the straight chain isomers of pentene. Cis-pentene-2 boiling at 37.1° C. is difficultly separable from trans-pentene-2 which boils at 36.4° C. By contact with a ruthenium oxide containing catalyst according to the present invention, trans-pentene-2 can be converted to pentene-1 which boils at 30.0° C. and therefore is much more easily separated by fractionation. Thus the trans-isomer of a mixture of cis and trans-isomers of pentene-2 can be converted to pentene-1, which can be separated by fractionation, resulting in the recovery of a fraction having a high concentration of the cis-isomer. If desired, pentene-1 can again be converted to trans-pentene-2.

The catalyst used in the process of the present invention comprises ruthenium oxide. Preferably the ruthenium oxide is associated with a suitable support material. Preferred supports include silica, silica-alumina, alumina, and titania. Excellent results are obtained when the support is silica. When the catalyst support is silica, any suitable catalyst grade silica can be employed. Some examples are precipitated silica gel, microspheroidal silica, flame hydrolyzed silica and silica aerogels. These materials have appreciable surface area, usually in the range of 50 to 700 m.²/g., and can range from fine powders to coarse granules. These materials often contain small amounts of other compounds, including for example, amounts of alumina and sodium in the order of a few tenths of a percent by weight and smaller. Amounts of these and other materials which do not substantially prevent the desired reaction or unduly promote side reactions are acceptable.

A sufficient amount of the ruthenium oxide is used to obtain the desired activity. Because ruthenium oxide usually is more expensive than the support material, unnecessarily large amounts ordinarily are not used. Generally the catalyst composite contains from about 1 to about 15, preferably from about 2 to about 10, weight percent ruthenium oxide calculated as $RuO_2$ and can be prepared by any suitable method of catalyst preparation, preferably by impregnation. Before use, the catalyst composite can be activated or regenerated by contact with flowing air at elevated temperatures at a time sufficient to produce the desired activity. Activation temperatures in the range of about 800 to about 1200° F. for times ranging from about 0.1 to about 24 hours are suitable.

Conversion temperatures are in the range of 200 to about 700° F., at any suitable pressure. Good results are obtained with temperatures in the range of 300 to 600° F. Pressures in the range of from about 0 to about 2000 p.s.i.g., for example, can be used. The space rate for continuous operation usually will be in the range of from about 5 to about 15 parts by weight of feed per part by weight of catalyst per hour. After reaction, the reaction mixture can be separated as desired and unconverted materials recycled to the reaction zone.

The process is carried out by any suitable contacting technique, either batchwise or continuously, using a fixed catalyst bed, stirrer equipped reactor or other mobile catalyst contacting process.

EXAMPLE

Butenes were converted according to the process of the present invention by contact with a particulate (10–20 mesh) silica gel catalyst on which had been deposited 4.9 weight percent $RuO_2$. A 1.98 g. quantity of this catalyst formed a catalytic bed within a tubular fixed bed reactor. Before each run, the bed was regenerated by heating to 1000° F. in flowing air for 4 hours, then cooling to operating temperature in dry flowing nitrogen. A 4 ml. quantity of glass beads was located immediately upstream of the catalyst bed to act as a preheat zone.

Several butene feeds were isomerized by passage through the reaction zone. The essential conditions and results of the tests are shown in the attached table.

The data in the table show that the supported ruthenium oxide catalyst is not only active for shifting the double bond of butenes but is selective in that the 1-butene isomer and the trans-2-butene isomer are distinctly favored over the cis-2-butene isomer.

Substituting iron oxide or rhodium oxide for the ruthenium oxide does not give equivalent results. Only small isomerization activity giving conventional distribution of cis and trans isomers was observed.

What is claimed is:
1. A process for shifting the double bond of an olefin which comprises 1-monoolefin hydrocarbon or a trans-2-monoolefin hydrocarbon having at least 4 carbon atoms per molecule with a catalyst system comprising a composite of at least 1% by weight of ruthenium oxide on a support selected from the group consisting of silica, silica-alumina, alumina, and titania under conditions, including conditions of temperature, pressure and contact time suitable for obtaining a double bond isomer of said reactant, said temperature being in the range of about 200 to about 700° F.
2. The process of claim 1 wherein said support is silica.
3. The process of claim 2 wherein said reactant is a monoolefin hydrocarbon having 4 to 10 carbon atoms per molecule having the formula:

I 

or

II 

wherein I is trans configuration and wherein R can be an alkyl radical having 1 to 7 carbon atoms, or a phenyl, methylphenyl or cycloalkyl radical having 5 to 6 carbon atoms.
4. The process of claim 3 wherein said reactant is selected from the group consisting of 1-butene, 1-pentene, trans-2-butene, trans-2-pentene.
5. The process of claim 4 wherein said temperature is in the range of 300 to 600° F.

TABLE.—DOUBLE BOND ISOMERIZATION OF BUTENES

| Run | Catalyst | Temp., °F. | Press., p.s.i.g. | WHSV, g./g./hr. | Reactor feed, wt. percent | | | Reactor effluent, wt. percent [1] | | |
|---|---|---|---|---|---|---|---|---|---|---|
| | | | | | 1-$C_4^=$ | t-2-$C_4^=$ | c-2-$C_4^=$ | 1-$C_4^=$ | t-2-$C_4^=$ | c-2-$C_4^=$ |
| 1 | $RuO_2/SiO_2$ | 500 | 100 | 15 | 100 | | | 78.1 | 18.4 | 3.5 |
| 2 | Same | 300 | 300 | 15 | 100 | | | 87.8 | 10.2 | 2.0 |
| 3 | do | 500 | 100 | 15 | | 1.5 | 98.5 | 0.7 | 2.4 | 96.9 |
| 4 | do | 500 | 100 | 15 | | 51.4 | 48.6 | 5.1 | 47.0 | 47.9 |

[1] After 15 minutes on stream.

References Cited

UNITED STATES PATENTS

| | | | |
|---|---|---|---|
| 3,409,702 | 11/1968 | Plonsker et al. | 260—683.2 |
| 3,114,698 | 12/1963 | Viles | 260—683.2 |
| 3,205,282 | 9/1965 | Sparke et al. | 260—683.2 |
| 2,924,629 | 2/1960 | Donaldson | 260—683.2 |
| 3,217,057 | 11/1965 | Moore et al. | 260—683.2 |
| 3,428,704 | 2/1969 | Fishel | 260—683.2 |
| 3,352,939 | 11/1967 | Breckoff et al. | 260—683.2 |
| 3,352,938 | 11/1967 | Plonsker et al. | 260—683.2 |
| 3,367,988 | 2/1968 | McEnen | 260—683.2 |

DELBERT E. GANTZ, Primary Examiner

V. O'KEEFE, Assistant Examiner